United States Patent
Dey et al.

(10) Patent No.: US 11,157,941 B2
(45) Date of Patent: Oct. 26, 2021

(54) ADAPTIVE COUPON RENDERING BASED ON SHAKING OF EMOTION-EXPRESSING MOBILE DEVICE

(71) Applicant: International Business Machines Corporation, Armonk, NY (US)

(72) Inventors: Kuntal Dey, New Delhi (IN); Vijay Ekambaram, Tamilnadu (IN); Seema Nagar, Bangalore (IN); Swati Rallapalli, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 15/259,287

(22) Filed: Sep. 8, 2016

(65) Prior Publication Data

US 2018/0068339 A1    Mar. 8, 2018

(51) Int. Cl.
*G06Q 30/02*    (2012.01)
*G06F 16/9535*    (2019.01)
(Continued)

(52) U.S. Cl.
CPC ..... *G06Q 30/0239* (2013.01); *G06F 16/9535* (2019.01); *G06F 16/9537* (2019.01);
(Continued)

(58) Field of Classification Search
None
See application file for complete search history.

(56) References Cited

U.S. PATENT DOCUMENTS 6,587,835 B1 * 7/2003 Treyz ............... G06Q 20/12
705/14.64
7,751,805 B2 * 7/2010 Neven ............... G06K 9/228
455/3.01
(Continued)

FOREIGN PATENT DOCUMENTS

AU    2012101631 A4 * 12/2012
CN    102802049    11/2012
(Continued)

OTHER PUBLICATIONS

Xu, G., Li, X., Zhou, H., Lei, J., & Zhang, Z. (2016). The mobile visual search guiding system based on SIFT. International Journal of Future Generation Communication and Networking, 9(6), 165-178. doi:http://dx.doi.org/10.14257/ijfgcn.2016.9.6.16 (Year: 2016).*
(Continued)

*Primary Examiner* — Kambiz Abdi
*Assistant Examiner* — Scott Snider
(74) *Attorney, Agent, or Firm* — Fleit Intellectual Property Law; Donna Flores

(57) ABSTRACT

Various embodiments request discount offers on a mobile device within a store. In one embodiment, the mobile device detects it is being shaken and in response, sends a request for a discount offer to a server. The mobile device determines its location within the store. The mobile device receives a discount offer based on the location of the mobile device within the store and information associated with the mobile device. The discount offer is displayed and feedback is communicated to the server based on the detected device movement. The feedback is an indicator that indicates acceptance, rejection or a request for a different discount offer. The detected device movement include at least one of motion intensity, direction of motion and number of shakes. If the motion intensity of being shaken is greater than a
(Continued)

predetermined threshold, an indication of objection is emitted.

9 Claims, 5 Drawing Sheets

(51) Int. Cl.
| | |
|---|---|
| *G06F 16/9537* | (2019.01) |
| *H04W 4/02* | (2018.01) |
| *H04M 1/72454* | (2021.01) |
| *H04W 88/02* | (2009.01) |
| *H04W 4/021* | (2018.01) |
| *H04W 4/029* | (2018.01) |
| *H04M 1/72457* | (2021.01) |

(52) U.S. Cl.
CPC ..... *G06Q 30/0261* (2013.01); *G06Q 30/0267* (2013.01); *G06Q 30/0269* (2013.01); *H04M 1/72454* (2021.01); *H04W 4/02* (2013.01); *H04M 1/72457* (2021.01); *H04W 4/021* (2013.01); *H04W 4/027* (2013.01); *H04W 4/029* (2018.02); *H04W 88/02* (2013.01)

(56) References Cited

U.S. PATENT DOCUMENTS

| | | | |
|---|---|---|---|
| 8,489,112 B2 | 7/2013 | Roeding et al. | |
| 9,264,151 B1* | 2/2016 | Emigh | H04W 4/23 |
| 2006/0223588 A1* | 10/2006 | Hsi | H04M 1/72522 |
| | | | 455/564 |
| 2011/0043443 A1* | 2/2011 | Kawano | A63F 13/06 |
| | | | 345/156 |
| 2011/0144804 A1* | 6/2011 | Song | B25J 11/0015 |
| | | | 700/246 |
| 2011/0238476 A1 | 9/2011 | Carr et al. | |
| 2011/0307917 A1 | 12/2011 | Shuster | |
| 2012/0166261 A1 | 6/2012 | Velusamy et al. | |
| 2013/0183952 A1 | 7/2013 | Davis et al. | |
| 2013/0187850 A1* | 7/2013 | Schulz | G06F 3/03 |
| | | | 345/156 |
| 2013/0230210 A1* | 9/2013 | Boncyk | G06F 16/532 |
| | | | 382/103 |
| 2013/0332274 A1* | 12/2013 | Faith | G06Q 30/0225 |
| | | | 705/14.53 |
| 2014/0129365 A1* | 5/2014 | Harris | G06Q 30/08 |
| | | | 705/26.3 |
| 2015/0242941 A1 | 8/2015 | Viswanath et al. | |
| 2016/0027059 A1* | 1/2016 | Lofthus | G06Q 30/0267 |
| | | | 705/14.64 |
| 2016/0063529 A1 | 3/2016 | Roeding et al. | |
| 2016/0086029 A1* | 3/2016 | Dubuque | G06K 9/00979 |
| | | | 382/159 |

FOREIGN PATENT DOCUMENTS

| | | | | |
|---|---|---|---|---|
| CN | 103226782 | | 7/2013 | |
| CN | 105139234 | | 12/2015 | |
| CN | 105353862 A | * | 2/2016 | |
| CN | 105657937 A | * | 6/2016 | |
| WO | WO-2016033468 A1 | * | 3/2016 | ............ H04W 4/029 |

OTHER PUBLICATIONS

Girod, B., Chandrasekhar, V., Chen, D. M., Cheung, N. M., Grzeszczuk, R., Reznik, Y., . . . Vedantham, R. (2011). Mobile visual search (linking the virtual and physical worlds). IEEE Signal Processing Magazine, 28(4), 61-76. (Year: 2011).*
RetailMeNot shoppers trend report: Nearly 9 in 10 consumers still have holiday gifts to purchase:—9 in 10 (90%) consumers consider free shipping to be important when purchasing a product online. (Dec. 11, 2013). (Year: 2013).*
dailymail.com., "Out of battery? Just give your phone a quick shake", http://www.dailymail.co.uk/sciencetech/article-2232830/Out-battery-Just-phone-quick-shake-charge.html, Nov. 14, 2012, pp. 1-3.
Shake, "Android Apps on Google Play", https://play.google.com/store/apps/details?id=com.adl.appshaker&hl=en, last visited on Mar. 30, 2016, pp. 1-3.
Mobile Communication Media, "Shake Messenger", http://www.shakemessenger.com/, last visited on Mar. 30, 2016, pp. 1-5.
Shakeshake! for Sayhi, "ShakeShake! forSayHi—Android Apps on Google Play", https://play.google.com/store/apps/details?id=com.sayhi.plugin.shakeshake, last visited on Mar. 30, 2016, pp. 1-3.
Shake Screen on Off Free, "Shake Screen On Off Free—Android Apps on Google Play", https://play.google.com/store/apps/details?id=shake.screen.on.off&hl=en, last visited on Mar. 30, 2016, pp. 1-4.
Shake To Unlock, "Shake to Unlock—Android Apps on Google Play", https://play.google.com/store/apps/details?id=com.ndtsoft.shaketounlock&hl=en, last visited on Mar. 30, 2016, pp. 1-4.
appcrawlr.com., "10 Best Apps for Shake to Unlock", http://appcrawlr.com/android-apps/best-apps-shake-to-unlock, last visited on Mar. 30, 2016, pp. 1-5.
Shake Me, "Shake Me—Android Apps on Google Play", https://play.google.com/store/apps/details?id=polis.app.shakeme&hl=en, last visited on May 13, 2016, pp. 1-6.
Shake for Help, "Shake for Help—Stop Bullying—Android Apps on Google Play", https://play.google.com/store/apps/details?id=com.shakeforhelp&hl=en, last visited on May 13, 2016, pp. 1-5.
Sudha, V., et al., "A Fast and Robust Emotion Recognition System for Real-World Mobile Phone Data", IEEE International Conference on Multimedia & Expo Workshops, Jun. 29-Jul. 3, 2015, pp. 1-6.

* cited by examiner

ADAPTIVE COUPON RENDERING BASED ON SHAKING OF EMOTION-EXPRESSING MOBILE DEVICE

BACKGROUND

The present invention generally relates to mobile advertising, and more particularly relates to an emotion-expressing mobile device which safely enables pull based rendering of discount coupons for adapting offers based on the type of interaction with the device.

Today, methods exist for mobile phone users to receive personalized advertising. However, most of these methods are pushed-based, allowing retailers and other advertisers to annoy users by spammed them with coupons and advertisements at times random times. Typically, these coupons or offers are delivered to the mobile phone at inopportune times that the coupons are not needed, such as when the user is not shopping. In addition, the abundance of offers available online makes searching through these advertisements to find specific coupons difficult to pull when needed.

BRIEF SUMMARY

In various embodiments, a mobile device, computer program product and computer-implemented method for requesting discount offers on a mobile device within a store are disclosed. The mobile device detects it is being shaken and in response, sends a request for a discount offer to a server. The mobile device determines its location within the store. The mobile device receives a discount offer based on the location of the mobile device within the store and information associated with the mobile device.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Embodiments of the present invention provide a system and associated methods to safely enable an emotion-expressing mobile device (e.g., a cellular phone, wearable device, etc.) to provide pull-based rendering of discount coupons and adapt suggested offers based on how the device responds (i.e. how the phone is shaken or interacted with). It should be noted that the terms "mobile device," "user device," "mobile phone," "cellular phone," "smartphone" and "phone" are used interchangeably herein to indicate a handheld electronic device that is capable of communicating wirelessly and executing a retail application.

The user may intuitively express his degree of satisfaction/dissatisfaction with the received coupons by shaking the mobile device with varying intensity or in various directions. Offers may be adapted based on the intensity, direction or number of times the device is shaken, by pushing new coupons which may better satisfy the user. A shopper may also initiate a coupon request based on his location within a store, without disrupting his shopping activity, by shaking the phone. This coupon initiation or request allows customers to easily ask for coupons they need without being provided unnecessary ones.

The phone may emote a response back to user if the intensity of shaking is greater than a predetermined threshold. Thus, the phone may "express emotion" (e.g., anger, sorrow, etc.) by emitting a sound, vibration or visual indicator (e.g., flashing an LED, displaying a message or video on display screen, etc.) to ask the user to stop shaking the phone to avoid damage.

Embodiments of the present invention enable businesses to directly and quickly understand user interest. User interest is an area that has typically been very hard to do for brick and mortar retail stores, in contrast with online shopping where clicks and browsing can be tracked easily.

Operating Environment

Figure 1:
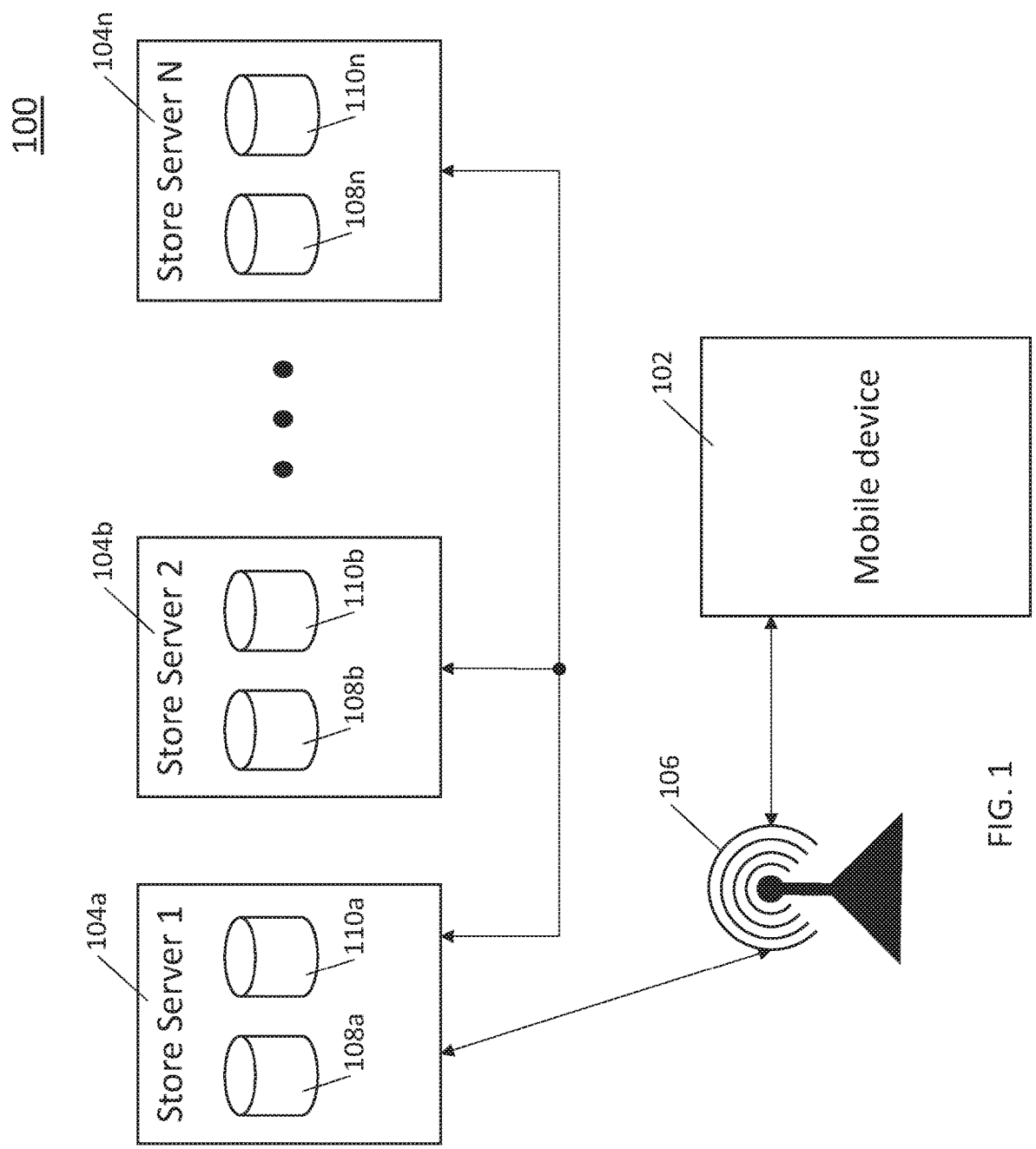
FIG. 1 is a block diagram illustrating one example of an operating environment comprising an adaptive coupon rendering system according to one embodiment of the present invention.

FIG. 1 shows one example of an operating environment of an adaptive coupon rendering system 100 for providing pull-based discount offers and coupons to a mobile device 102 according to one embodiment of the invention. The operating environment 100 comprises at least one mobile device 102 (one shown), and a plurality of store servers 104a, 104b, . . . , 104n (referenced herein, generally and collectively, as store server 104). In the embodiment shown, a specific retail store chain (e.g., Wal-mart™, Macy's™, etc.), each store may have a local store server 104a physically located on site at a particular branch and each local store server 104a is in communication (e.g., over an intranet or Internet) with other store servers 104b, 104n located at other physical branch locations. Alternately, the store server 104 for each physical store location may be physically co-located as one or more central servers in a remote location providing server functionality for a plurality of retail stores.

The mobile device 102 is in communication with one or more wireless access points 106 (one shown) located at various points within the retail store. The mobile device 102 communicates with the wireless access point 106 using a short-range communication protocol such as, for example, Bluetooth™, iBeacon™, Wi-Fi, etc. Alternately, the mobile device 102 may communicate with the store server 104 or a central server over a cellular network using known cellular communication techniques. Each wireless access point 106 is further in communication with the local store server 104a, either wirelessly (e.g., using Wi-Fi, Bluetooth, etc.) or via a wired connection (e.g., Ethernet). The local store server 104a knows the physical location of each wireless access point 106 within the retail store and can thus determine the location of the mobile device 102 using known techniques. For very small stores, a single access point 106, which may be co-located within the store server 104, may provide sufficient wireless coverage for the entire store.

Each store server 104 contains or is operably coupled with a user database 108 and a deal database 110. The user database 108 contains user profiles and preferences corresponding to a unique user ID for each user registered with the local store server 104. The user profile and preferences may include information gleaned from monitoring internet browsing/shopping history as well as information provided directly by the user. For example, the user profile may include information regarding the user's age, gender, ethnicity, place of residence, hobbies, personal and professional associations, birthday, number and ages of children, preferred language, etc. Each deal database 110 contains information about current discounts or special offers available at the retail store associated with the corresponding store server 104, such as blanket store-wide discounts or special discounts for specific items. In addition, each store server 104 may be in communication with external databases (not shown) containing information about other offers from competing stores.

Methods of Operation

Figure 2:
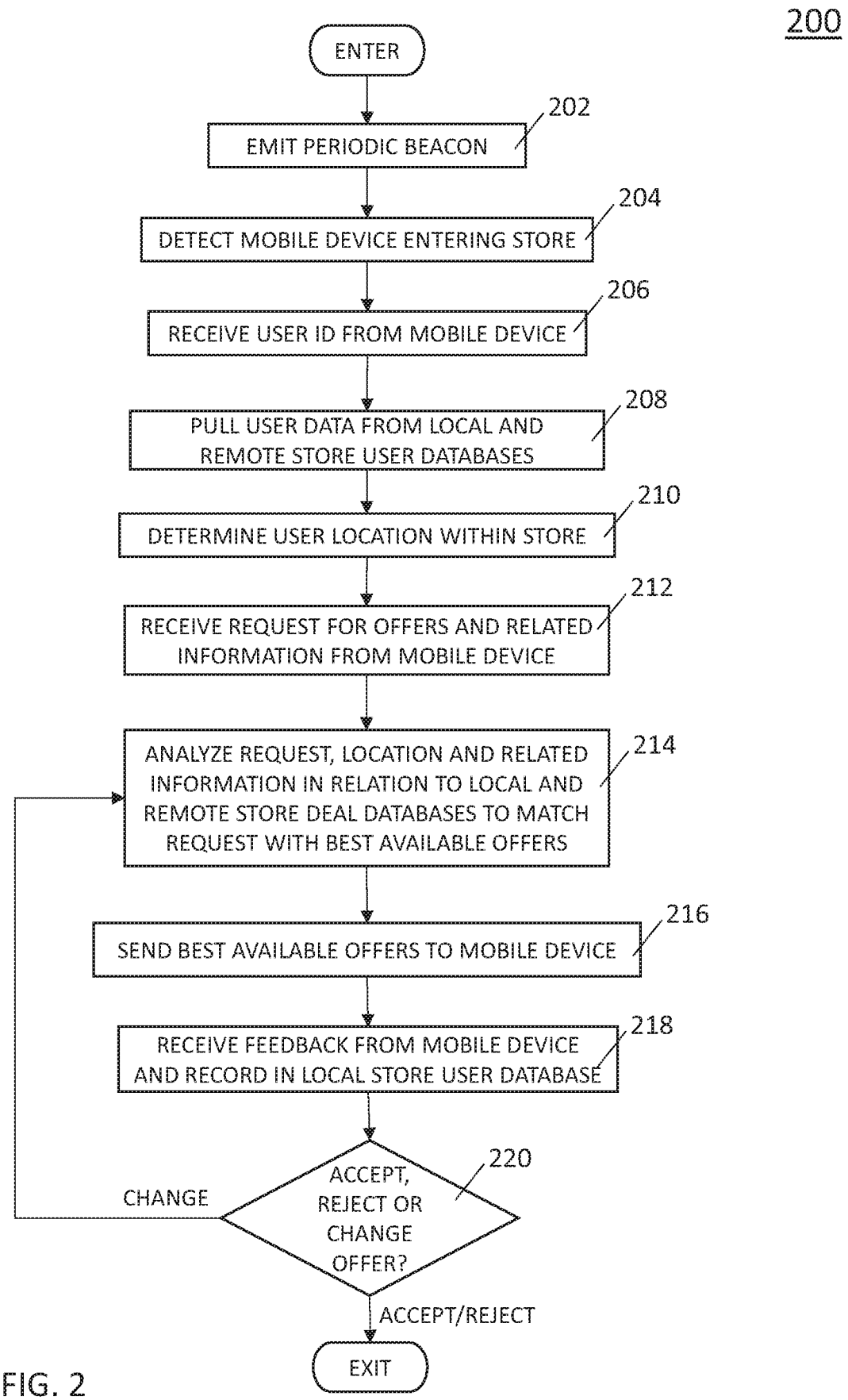
FIG. 2 is an operational flow diagram illustrating one process of a retail store server rendering coupons to a user device based on user location and preferences in response to a request for offers generated by shaking the user device according to one embodiment of the present invention.

FIG. 2 is an operational flowchart 200 describing a method for a store server 104 to deliver pull-based discount offers (e.g., coupons) to a mobile device 102 according to one embodiment of the present invention. Beginning in step 202, the store server 104 (or the wireless access points 106) periodically emit a beacon to search for a new device. When a customer enters the store (i.e. the area of wireless coverage provided by at least one wireless access point 106) carrying a mobile device 102 which has installed and activated a retail application from that store, the local store server 104a detects, in step 204, the mobile device 102 entering the store.

The store server 104 receives, in step 206, a user ID from the mobile device 102. The store server 104 may query the detected mobile device 102 for its user ID, or the retail store application may automatically send the user ID to the store server 104 upon detection. The local store server 104a pulls, in step 208, a user profile and preferences associated with the user ID from a local user database 108a within or accessible to the local store server 104a, as well as from remote user databases 108b, . . . , 108n accessible to remote store servers 104b, . . . , 104n from different locations within the same store chain.

The local store server 104a determines, in step 210, the location of the mobile device 102 within the retail store. The local store server 104a may make this determination based on received signal strength of the signal received from the mobile device 102 at each wireless access point 106 within communication range with the mobile device 102. Optionally, the mobile device 102 may obtain the location information using other methods (e.g., using Global Positioning System (GPS), cellular system location services, etc.) and provide the location information directly to the local store server 104a. The local store server 104a may periodically update the location of the mobile device 102 within the store (e.g., after a predetermined period of time, responsive to a hand-off between wireless access points 106, etc.)

The local store server 104a receives, in step 212, a request to receive offers from the mobile device 102. The request is initiated by the user shaking the mobile device 102 and may also include additional, specific information concerning items in which the user of the mobile device 102 has a particular interest. For example, the user may scan a document or take a picture of item of interest and then shake the phone to obtain related coupons. The local store server 104a (or the retail application) uses image recognition and optical character recognition to identify the item. Additionally, because the local store server 104a knows the position of the mobile device 102 within the store, as well as the contents of the store at that particular location, the local store server 104a can deduce that the user is interested in items displayed at that location. The local store server 104a analyzes, in step 214, the request, location within the store and any related information accompanying the request to match the request with the best available offers stored in local or remote deal databases 110. The local store server 104a sends, in step 216, the best available offers related to the request to the mobile device 102.

The user of the mobile device 102 can provide feedback to the local store server 104 concerning the received offer. Feedback may be easily provided by shaking the mobile device 102 in different manners, which is described in more detail below. The local store server 104a receives the feedback, in step 218, and records the feedback in the local user database 108a. If the feedback indicates, in step 220, that the offer is accepted or rejected, the process ends. However, if the feedback indicates, in step 220, that the user desires a different offer, the method returns to step 214 where the local store server 104a reanalyzes the request, location and related information, including any new, additional information sent by the mobile device 102 in respect to the current offers in the local and remote deal servers 110 and sends a new offer to the mobile device 102.

Figure 3:
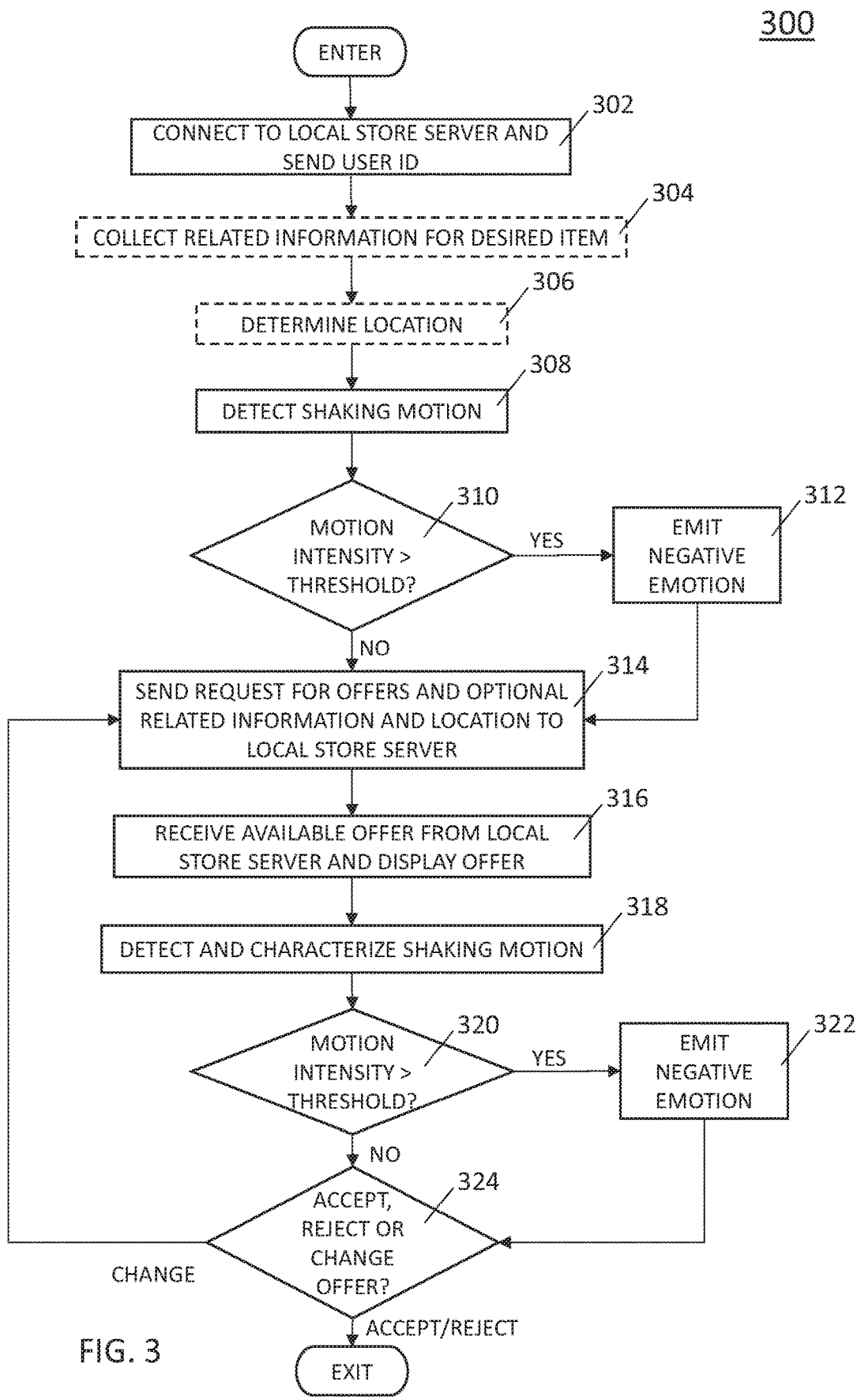
FIG. 3 is an operational flow diagram illustrating one process of a user device requesting discount offers from a retail store server based on user location and preferences by shaking the user device according to one embodiment of the present invention.

FIG. 3 is an operational flowchart 300 describing a method for a mobile device 102 to request and receive pull-based discount offers (e.g., coupons) from a store server 104 according to one embodiment of the present invention. Beginning in step 302, upon entering a retail store for which the mobile device 102 has a retail application installed and operating, the mobile device 102 connects to a local store server 104a either directly or via one or more wireless access points 106 and sends a user ID associated with the user of the mobile device 102 to the local store server 104a.

While the mobile device user is shopping in the store, they may encounter an item for sale in which they have an interest to purchase. The user may easily request discount offers (i.e. coupons) or other background information concerning the item by shaking the mobile device 102. It should be noted that the request may be made by shaking the mobile device 102 even when the screen is locked, thereby providing easier access and saving screen space for object display as the retail application does not have to render interactive buttons on a touchscreen display. In addition, the user may optionally collect, in step 304, additional information regarding a particular item of interest. For example, the user may capture a picture of the item using the mobile device's camera, or initiate a search for information about the item on the Internet using the mobile device's web browser. The retail app uses image recognition and optical character recognition to identify the item.

The mobile device 102, optionally, determines its location in step 306. As discussed above, this function may also be performed by the local store server 104. The mobile device 102 may obtain its location information via an onboard GPS transceiver, from a cellular network, etc.

When the user determines she would like an offer or information on an item in the store, she simply shakes her mobile device 102. The mobile device 102 detects the shaking motion (i.e. detects that the smart price tag 104 is being shaken), in step 308, using a motion sensor such as an accelerometer or gyroscope. It should be noted that the intensity of the shaking motion should be above a first predetermined threshold level in order to indicate actual shaking. However, if the motion intensity is greater than a second predetermined level in step 310, there is a greater likelihood that the mobile device 102 could be damaged by the vigor of the shaking. Thus, the mobile device 102 may voice its "objection" to the degree of shaking by emitting, in step 312, a negative emotion (such as by sounding a warning through a transducer, displaying a warning message on the display, vibrating, etc.). It should be noted that the second predetermined intensity threshold is greater than the first predetermined threshold.

In step 314, the mobile device 102 sends a request to the local store server 104a. The request is based on the mobile device 104 location and any optionally collected related information. The local store server 104a analyzes the request, along with the location information and stored user profile and preferences, to match the request with currently available offers from the local and remote deal databases 110. The mobile device 102 receives, in step 316, at least one available offer from the local and remote databases 110 as determined and sent by the local store server 104a. The mobile device 102 renders the received offer on a display of the mobile device 102.

The actions of the user on the mobile device 102 determine further steps of the process. For example, if the user likes the offer, she can do nothing or shake the mobile device 102 lightly. If she does not like the offer, she can shake the mobile device 102 more violently. Further different directions of shaking or number of shakes may mean different things—just like a person nodding to say "yes" or "no." For example, two shakes may indicate that the user desires a different offer, or is not satisfied with a particular characteristic of the offer (e.g., the user is interested in a different item, the user would like a similar item in a different brand, the user is not satisfied with the offered discount, etc.).

As "gentle" and "violent" varies from person to person, the mobile device 102 may use cognitive learning techniques to learn what gestures mean like/dislike for a particular person based on history or calibration of gestures. Some initial training can be performed when the user installs the retail app by asking the user to shake the phone in a certain way and noting down the sensor values. Additional patterns or intensities will be learned over time.

If the shaking is too violent (i.e. the motion intensity is greater than a predetermined threshold), in step 320, as discussed above, the mobile device 102 can emit a negative emotion indication (such as a siren, vibration, etc.), in step 322, to indicate that damage can happen. This indication is powerful as it demonstrates that objects can express emotion.

Depending upon the characterization of the shaking motion, in step 324, the process will return to step 314 and request a different offer if the mobile device 102 characterizes the motion as indicating the user wishes to change offers, or the process ends if the mobile device 102 characterizes the motion as indicating the user wishes to accept or reject (i.e. stop receiving offers) the offer.

Mobile Device

Figure 4:
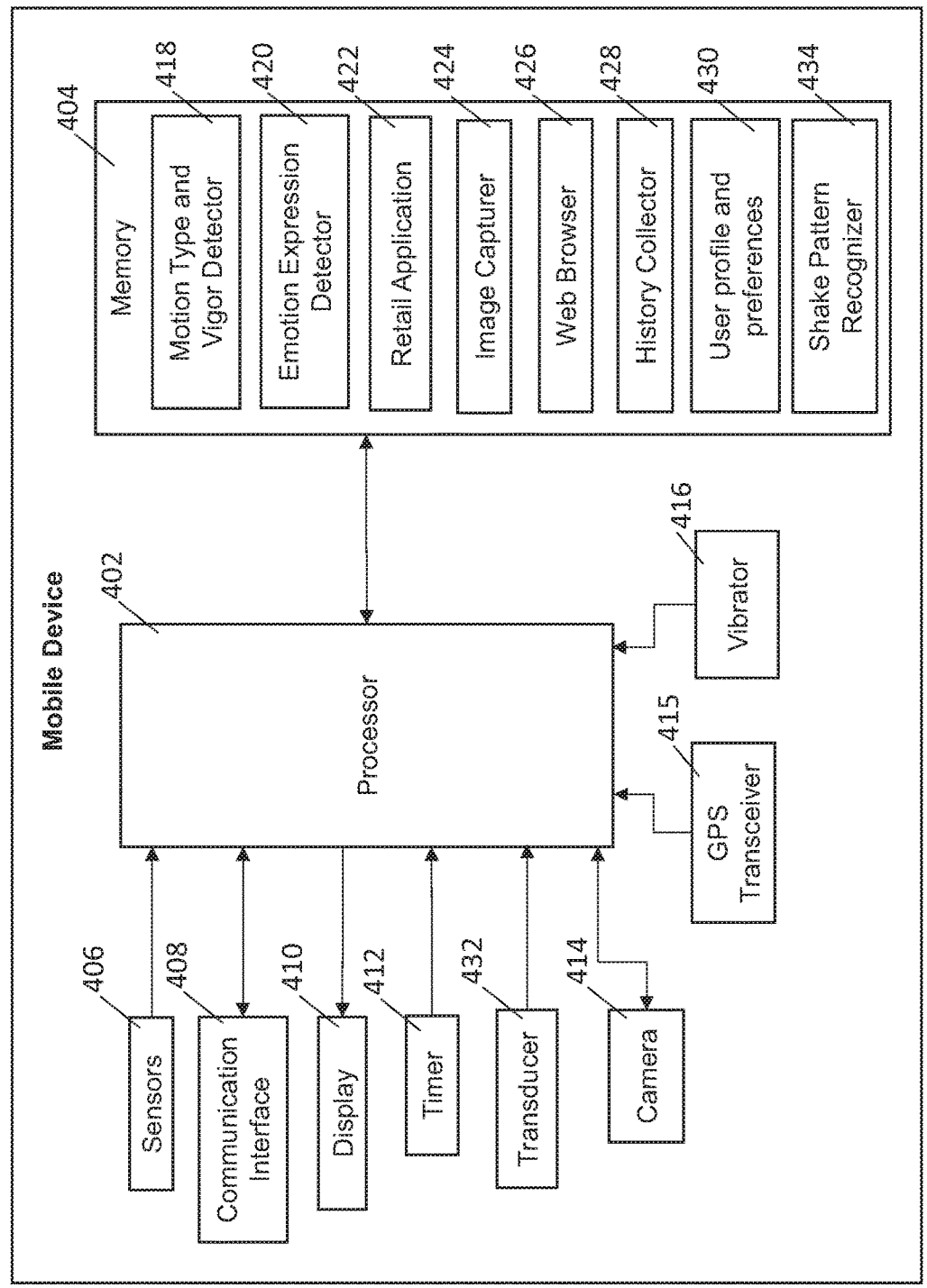
FIG. 4 is a block diagram of one example of an example user device used in accordance with one example of the present invention.

A detailed block diagram of an example smart price tag is shown in FIG. 4 in accordance with one example of the present invention. The mobile device 102 includes a processor 402 operably coupled to a memory 404, one or more sensors 406 (such as an accelerometer, a gyroscope, etc.), a communication interface 408, a display 410, a timer 412, a transducer 432 (such as a speaker, vibrator, siren, buzzer, etc.), a camera 414, an optional GPS transceiver 415 and a vibrator 416.

The communication interface 408 allows the mobile device 102 to communicate with the local store server 104a using short range communication protocols (such as Wi-Fi, Bluetooth, etc.). The communication interface 408 also allows the mobile device 102 to communicate over cellular networks using well-known protocols (e.g., Code Division Multiple Access (CDMA), Global System for Mobile Communications (GSM), Enhanced Data rates for GSM Evolution (EDGE), Long Term Evolution (LTE), etc.).

The display 410 may be a liquid crystal display (LCD) having touchscreen capabilities or other type of display.

The memory 404 stores various elements for performing the functions of the methods discussed herein (such as a motion type and vigor detector 418, an emotion expression detector 420, a retail application 422, an image capturer 424, a web browser 426, a history collector 428 and a shake pattern recognizer 434) as well as user profile and preference data 430.

The motion type and vigor detector 418 works in conjunction with the motion sensor 406 to determine when the mobile device is being shaken and the intensity of the motion. The emotion expression detector 420 receives input from the motion type and vigor detector 418 and determines when the motion intensity exceeds a predetermined threshold. When the motion is too vigorous, the emotion expression detector 420 indicates a negative emotion to the user by activating at least one of the transducer 432, the vibrator 416, the display 410, an LED (not shown), etc. Additionally, the shake pattern recognizer 434 works with the motion type and vigor detector 418 and the motion sensor 406, using cognitive learning, to learn the characteristics of shaking patterns and intensities of a particular user.

The retail application 420 executes the functionality described in the operation flowchart 300 of FIG. 3 to interact with and present current offers to the user of the mobile device 102. The image capturer 424 operates in conjunction with the camera 414, and potentially the web browser 426, to capture images of desired items. The history collector 428 collects information about the user's web browsing history and, optionally, information relating to activity occurring on other installed applications and purchasing history. The history collector 428 shares the information it collects with the user profile and preferences 430.

Store Server

Figure 5:
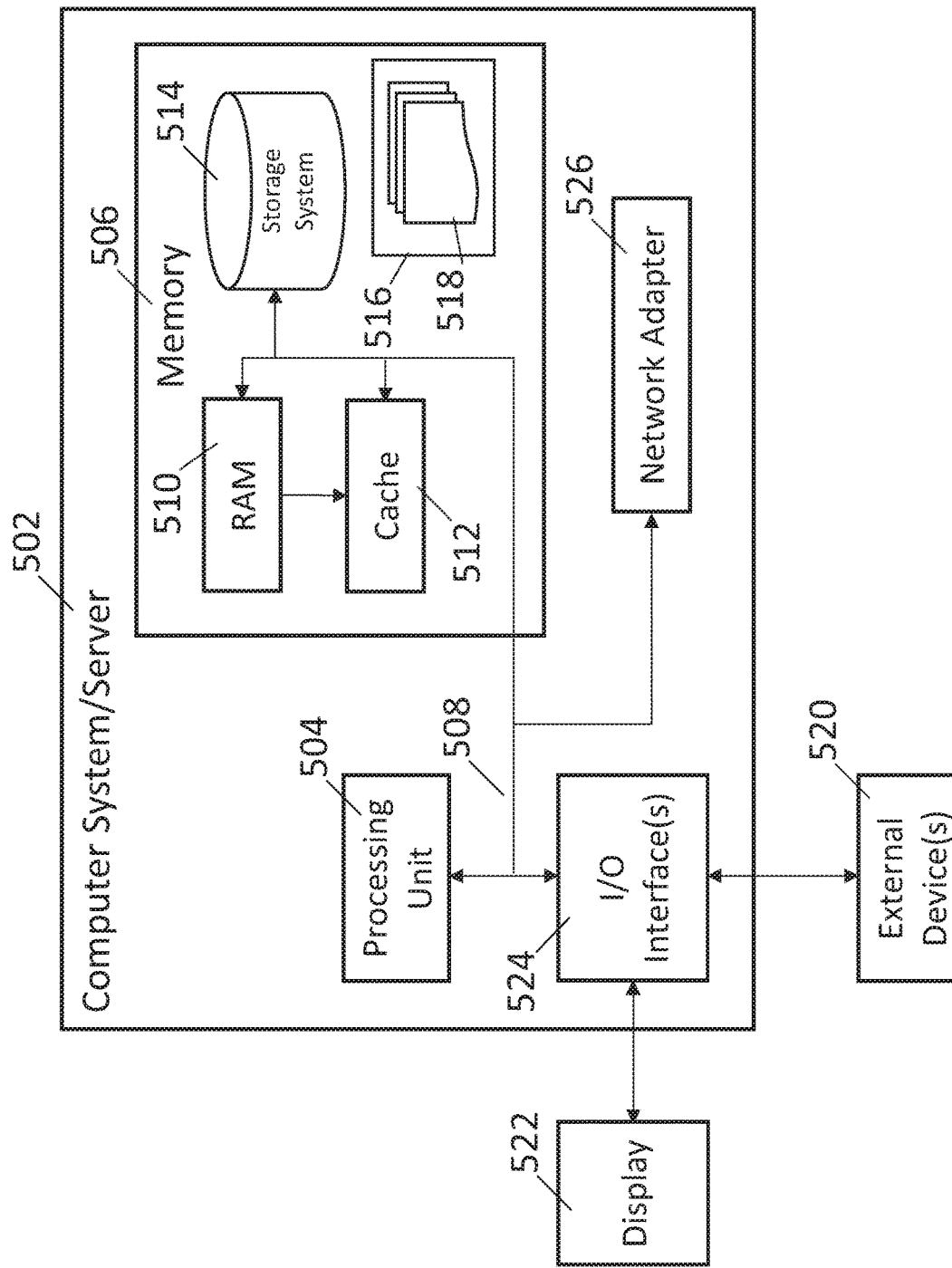
FIG. 5 is a block diagram of one example of a retail store server according to one embodiment of the present invention.

FIG. 5 depicts a block diagram illustrating an information processing system that can be utilized in embodiments of the present invention. As depicted, the information processing system 502 is based upon a suitably configured processing system configured to implement one or more embodiments of the present invention (e.g., store server 104). Any suitably configured processing system can be used as the information processing system 502 in embodiments of the present invention. The components of the information processing system 502 can include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 5, the main memory 506 may include a user database 108, and a deal database, as shown in FIG. 1. One or more of these components can reside within the system memory 506, or be a separate hardware component. The system memory 506 can also include computer system readable media in the form of volatile memory, such as random access memory (RAM) 510 and/or cache memory 512. The information processing system 502 can further include other removable/non-removable, volatile/non-volatile computer system storage media. By way of example only, a storage system 514 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 408 by one or more data media interfaces. The memory 506 can include at least one program product having a set of program modules that are configured to carry out the functions of an embodiment of the present invention.

Program/utility 516, having a set of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of embodiments of the present invention.

The information processing system 502 can also communicate with one or more external devices 520 (such as a keyboard, a pointing device, a display 522, etc.); one or more devices that enable a user to interact with the information processing system 502; and/or any devices (e.g., network card, modem, etc.) that enable computer system/server 502 to communicate with one or more other computing devices. Such communication can occur via I/O interfaces 524. Still yet, the information processing system 502 can communicate with one or more networks such as a local area network (LAN), a general wide area network (WAN), and/or a public network (e.g., the Internet) via network adapter 526. As depicted, the network adapter 526 communicates with the other components of information processing system 502 via the bus 508. Other hardware and/or software components can also be used in conjunction with the information processing system 502. Examples include, but are not limited to: microcode, device drivers, redundant processing units, external disk drive arrays, RAID systems, tape drives, and data archival storage systems.

Sample Use Scenarios

In a first sample use scenario, Bob's phone 102 discovers that he is interested in buying Ray-Ban™ polarized sunglasses from his online browsing activity. Bob has the retail application 422 for a store that carries the sunglasses installed on his phone or wearable device 102. When Bob enters the shop, the store server 104 detects the entry and pulls his user profile. In the sunglass section, Bob shakes his device 102 to indicate he desires a discount offer. The local store server 104 determines his location using iBeacon access points 106 and deduces that he is interested in sunglasses. The local store server 104 sends details of an offer for 30% off sunglasses to Bob's phone 102 which is rendered on the device display 410 as an image of the glasses and the text "30% off." Because Bob is interested in the sunglasses, he is interested in the coupon and shakes the phone 102 lightly—only once to accept the coupon. Bob can now use the coupon at checkout to receive a 30% discount on the glasses. This information is stored in his user profile, either on the device 102, on the local store server 104a, or both, for future use.

In a second example scenario, Bob is in the menswear section of a retail department store. The local store server 104 detects his location using iBeacon access points 106. He requests to receive a discount offer by shaking his phone 102. Because the local store server 104a knows he is in the menswear section, a coupon for 30% off ties is sent to his phone 102. However, Bob does not want a tie, so he shakes his phone 102 four times to indicate he is interested in a different item. The local store server 104 then returns an alternate discount coupon for 30% off a particular shirt. As Bob wants a shirt, but not the offered shirt, he shakes the phone 102 three times. The local store server 104a then returns an offer for 10% off a different shirt. He likes the shirt, but is not happy with the discount, so he shakes the phone 102 twice. The local store server 104a returns an offer for a different, but similar, shirt with a better discount of 30%. Bob likes this offer, so he shakes the phone 102 once to accept the offer. All the information regarding this transaction is stored in his user profile.

In a third example use scenario, Bob is in a grocery store near the cereal aisle. He uses his phone 102 to take a picture of Quaker™ oats and, while displaying the picture, shakes his phone to request discount coupons. The local store server 104a returns a message to the phone 102 indicating there are currently no deals on Quaker™ oats. Bob shakes the phone twice to indicate he likes the item but not the deal. The local store server 104a responds with a different brand of oats with a better deal (e.g., 30% off). Bob shakes the phone 102 once to accept the offer. This data is stored in his user profile.

Non-Limiting Embodiments

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit"," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for requesting discount offers on a mobile device within a retail store, the method comprising:

detecting, by a motion sensor in the mobile device, that the mobile device is being shaken a first number of shakes;

determining a motion intensity level of the detected mobile device being shaken;

in response to determining that the motion intensity level exceeds a threshold level learned for a specific user of the mobile device, emitting an indication of objection indicating negative emotion; and in response to determining that the motion intensity level is below the threshold level learned for the specific user:

determining a location of the mobile device within the retail store;

capturing an image of a desired item for sale in which a user of the mobile device has an interest to purchase;

performing image recognition on the captured image;

obtaining information related to the desired item based on the captured image;

sending information related to the desired item, along with a request for a discount offer pertaining to the desired item, from the mobile device to a deal database containing information on discount offers available at the retail store, in response to said detecting the mobile device is being shaken;

receiving a discount offer at the mobile device, based on the location of the mobile device within the retail store, the information related to the desired item and information associated with the mobile device; and displaying the discount offer on a display of the mobile device.

2. The method of claim 1, wherein the location of the mobile device within the retail store is determined using one of the group consisting of: a plurality of wireless access points, a Global Positioning System (GPS) transceiver and a cellular network.

3. The method of claim 1, the information is a mobile device user profile.

4. The method of claim 1, wherein the mobile device communicates with a server using a short-range communication protocol.

5. The method of claim 1, wherein the indication of objection is selected from a group consisting of: a sound, a vibration and a visual indicator.

6. A mobile device for requesting discount offers from within a retail store in a chain of retail stores, the mobile device comprising:
- a memory storing computer instructions;
- a motion sensor that detects the mobile device is being shaken;
- a transducer that emits an indication of objection indicating a negative emotion responsive to a determination that a motion intensity level exceeds a threshold level learned for a specific user of the mobile device;
- a communication interface;
- a display that displays discount offers;
- a camera that captures an image of a desired item for sale in which a user of the mobile device has an interest to purchase; and
- a processor, operably coupled with the memory, the sensor and the communication interface, which:
  - determines the motion intensity level of the detected mobile device being shaken; and
  - in response to determining that the motion intensity level is below the threshold level learned for the specific user:
    - determines a location of the mobile device within the retail store;
    - performs image recognition on the captured image;
    - obtains information related to the desired item based on the captured image;
    - sends the information related to the desired item, along with a request for a discount offer pertaining to the desired item, to a deal database containing information on discount offers available at the retail store, in response to detecting the mobile device is being shaken a certain number of shakes; and
    - receives a discount offer based on the location of the mobile device within the retail store, the information related to the desired item and information associated with the mobile.

7. The mobile device of claim 6, wherein the indication of objection is selected from a group consisting of: a sound, a vibration and a visual indicator.

8. A computer program product for requesting discount offers on a mobile device within a retail store, the computer program product comprising a non-transitory computer readable storage medium having program instructions embodied therewith, the program instructions executable by a processor to cause the mobile device to:
- detect, by a motion sensor in the mobile device, that the mobile device is being shaken a certain number of shakes;
- determine a motion intensity level of the detected mobile device being shaken;
- in response to determining that the motion intensity level exceeds a threshold level learned for a specific user of the mobile device, emit an indication of objection indicating negative emotion; and
- in response to determining that the motion intensity level is below the threshold level learned for the specific user:
  - determine a location of the mobile device within the retail store;
  - perform image recognition on the captured image;
  - obtain information related to the desired item based on the captured image;
  - send the information related to the desired item, along with a request for a discount offer pertaining to the desired item, from the mobile device to a deal database containing information on discount offers available at the retail store, in response to detecting the mobile device is being shaken;
  - receive a discount offer based on the location of the mobile device within the retail store, the information related to the desired item and information associated with the mobile device; and
  - display the discount offer on a display of the mobile device.

9. A computer program product for communicating discount offers to a mobile device within a retail store, the computer program product comprising a non-transitory computer readable storage medium having program instructions embodied therewith, the program instructions executable by a processor to cause a server containing information on discount offers available at the retail store to:
- determine a motion intensity level of the mobile device being shaken;
- in response to determining that the motion intensity level exceeds a threshold level learned for a specific user of the mobile device, emit an indication of objection indicating negative emotion; and
- in response to determining that the motion intensity level is below the threshold level learned for the specific user:
  - determine a location of the mobile device within the retail store;
  - capture an image of a desired item for sale in which a user of the mobile device has an interest to purchase;
  - perform image recognition on the captured image;
  - obtain information related to the desired item based on the captured image;
  - send the information related to the desired item, along with a request for a discount offer pertaining to the desired item, from the mobile device to a deal database containing information on discount offers available at the retail store, in response to detecting the mobile device is being shaken;
  - receive information related to a desired item along with a request for a discount offer from the mobile device, wherein the request is associated with detecting, by a motion sensor in the mobile device, that the mobile device is being shaken a first number of shakes;
  - communicate a discount offer to the mobile device based on the location of the mobile device within the retail store, the information related to the desired item and information associated with the mobile device.

* * * * *